(12) United States Patent
Eger

(10) Patent No.: US 8,946,926 B2
(45) Date of Patent: Feb. 3, 2015

(54) ELECTRICAL SUPPLY AND STARTING SYSTEM FOR A MOTOR VEHICLE AND METHOD FOR OPERATING THE ELECTRICAL SUPPLY AND STARTING SYSTEM

(75) Inventor: Ulrich Eger, Zaberfeld (DE)

(73) Assignee: Dr. ING. H.C.F. Porsche Aktiengesellschaft, Stuttgart (DE)

( * ) Notice: Subject to any disclaimer, the term of this patent is extended or adjusted under 35 U.S.C. 154(b) by 784 days.

(21) Appl. No.: 13/105,013

(22) Filed: May 11, 2011

(65) Prior Publication Data

US 2011/0309675 A1 Dec. 22, 2011

(30) Foreign Application Priority Data

Jun. 17, 2010 (DE) .......................... 10 2010 017 417

(51) Int. Cl.
| | | |
|---|---|---|
| *B60L 1/00* | (2006.01) | |
| *B60K 6/30* | (2007.10) | |
| *B60L 7/14* | (2006.01) | |
| *B60L 11/00* | (2006.01) | |
| *B60L 11/14* | (2006.01) | |
| *B60L 11/16* | (2006.01) | |
| *F02N 11/00* | (2006.01) | |

(52) U.S. Cl.
CPC ... *B60K 6/30* (2013.01); *B60L 7/14* (2013.01); *B60L 11/005* (2013.01); *B60L 11/14* (2013.01); *B60L 11/16* (2013.01); *F02N 11/00* (2013.01); *B60L 2210/12* (2013.01); *B60L 2210/14* (2013.01); *Y02T 10/6278* (2013.01); *Y02T 10/7022* (2013.01); *Y02T 10/7027* (2013.01); *Y02T 10/7033* (2013.01); *Y02T 10/7077* (2013.01); *Y02T 10/7225* (2013.01); *Y02T 10/7233* (2013.01); *B60Y 2400/112* (2013.01); *B60Y 2400/114* (2013.01)
USPC .......... 307/10.6; 307/9.1; 307/10.1; 307/10.3

(58) Field of Classification Search
CPC .................................................. F02N 11/0866
USPC ................................ 307/10.1, 10.6, 9.1, 10.3
See application file for complete search history.

(56) References Cited

U.S. PATENT DOCUMENTS

| | | | |
|---|---|---|---|
| 3,463,995 A | 8/1969 | Herold | |
| 5,816,358 A * | 10/1998 | Adler et al. | ................ 180/279 |
| 6,583,523 B1 * | 6/2003 | Bhate | ............... 307/86 |
| 6,919,648 B2 * | 7/2005 | Bolz et al. | ................ 290/40 C |
| 6,995,480 B2 | 2/2006 | Amano et al. | |

(Continued)

FOREIGN PATENT DOCUMENTS

| | | |
|---|---|---|
| DE | 4307907 A1 | 5/1994 |
| DE | 10150374 A1 | 4/2003 |

(Continued)

*Primary Examiner* — Jared Fureman
*Assistant Examiner* — Carlos Laguerre
(74) *Attorney, Agent, or Firm* — Gerald E. Hespos; Michael J. Porco; Matthew T. Hespos

(57) ABSTRACT

An electrical supply and starting system for a motor vehicle has a variable-voltage on-board electrical system that can be operated by two different DC voltages for supplying the motor vehicle, and having a motor/generator system that operates as a generator to deliver electrical energy to the on-board electrical system of the motor vehicle, and operates for starting an internal combustion engine of the motor vehicle.

13 Claims, 2 Drawing Sheets

(56) References Cited

U.S. PATENT DOCUMENTS

| | | |
|---|---|---|
| 7,963,264 B2 | 6/2011 | Reynolds |
| 2003/0117019 A1* | 6/2003 | Furukawa et al. ............ 307/10.6 |
| 2003/0117113 A1* | 6/2003 | Takemasa et al. ............. 320/150 |
| 2004/0041403 A1* | 3/2004 | Fattic ........................... 290/38 E |
| 2005/0082095 A1* | 4/2005 | Tamai et al. .................. 180/65.1 |
| 2005/0253458 A1* | 11/2005 | Omae et al. ................... 307/10.1 |
| 2008/0220932 A1* | 9/2008 | Bosch et al. ....................... 477/3 |
| 2008/0224537 A1* | 9/2008 | Uhl ............................... 307/10.1 |
| 2010/0001523 A1* | 1/2010 | Sato et al. ......................... 290/31 |
| 2010/0289452 A1* | 11/2010 | Wagatsuma et al. .......... 320/109 |

FOREIGN PATENT DOCUMENTS

| | | |
|---|---|---|
| DE | 102 53 372 | 5/2003 |
| DE | 10250488 A1 | 5/2004 |
| DE | 102005046342 A1 | 4/2007 |
| DE | 102007026164 A1 | 12/2008 |
| DE | 102007036665 A1 | 3/2009 |
| DE | 102008022582 A1 | 11/2009 |
| EP | 1529692 A1 | 5/2005 |

* cited by examiner

ELECTRICAL SUPPLY AND STARTING SYSTEM FOR A MOTOR VEHICLE AND METHOD FOR OPERATING THE ELECTRICAL SUPPLY AND STARTING SYSTEM

CROSS REFERENCE TO RELATED APPLICATION

This application claims priority under 35 USC 119 to German Patent Application No 10 2010 017 417.3 filed on Jun. 17, 2010, the entire disclosure of which is incorporated herein by reference.

BACKGROUND OF THE INVENTION

1. Field of the Invention

The invention relates to an electrical supply and starting system for a motor vehicle, and to a method for operating such a system.

2. Description of Related Art

Many motor vehicles have an internal combustion engine that is started by an integrated starter/generator system instead of by a conventional starter. The starter/generator system typically functions as a generator and also as a motor for starting the internal combustion engine. Small internal combustion engines (up to an engine capacity of approximately 2 liters) can be started by a starter/generator system of this kind with an on-board system voltage of 12 volts, such as an on-board system supplied from a conventional lead-acid battery. Larger motors require a higher voltage (for example 20 V) to provide the torque necessary to start an engine.

U.S. Pat. No. 6,995,480 B2 describes a power supply device for a motor vehicle having a motor/generator, an electronics system for driving the motor/generator, a conventional battery and a double-layer capacitor. The double-layer capacitor is connected directly to a DC voltage side of an inverter, and the battery is connected in parallel with the double-layer capacitor. Energy stored in the capacitor is used to start the internal combustion engine and electrical switches are used to disconnect the battery from the motor/generator system in specific situations.

DE 102 53 372 A1 describes an automatic machine starting system for machines having a large number of batteries. When an internal combustion engine of the machine is started, the batteries are connected in series to start the machine by supplying voltage of the batteries to a starter/generator of the machine starting system. While the machine is running, a control circuit, with the aid of a relay, connects the batteries back into a parallel circuit for charging purposes.

U.S. Pat. No. 3,463,995 describes an electrical power supply system for vehicles having an internal combustion engine, an electrical starter and further auxiliary batteries. The apparatus has a main battery with a high capacitance and auxiliary batteries with capacitances lower than the main battery. The various connections, relays and switches and the main battery are used in conjunction with the auxiliary batteries to start the internal combustion engine.

A starter/generator system for motor vehicles combines functions of a starter and a generator in a single electrical machine. The efficiency of a modern hybrid motor vehicle is increased by powerful starter/generators. More particularly, electrical energy is returned to the vehicle battery in a recuperative manner when the hybrid motor vehicle is braked, and this electrical energy can be used later. Vehicles with internal combustion engines that have a relatively large engine capacity require a relatively high voltage for operating the generator to provide the required torque for starting the engine.

Therefore, electrical buffer storage means with a higher voltage are required in such vehicles. High-capacitance double-layer capacitors usually are used in this case. Furthermore, operation at a relatively high voltage is also usual when the starter/generator system is operated in generator mode, so that the double-layer capacitors can be charged. However, this means a voltage converter for converting this relatively high voltage to 12 volts is required since the on-board system voltage of the vehicles has to continue to be kept at 12 volts to use cost-effective, conventional electrical components. Therefore, a high level of outlay is required overall for vehicles with relatively large internal combustion engines. This outlay being reflected in price and making the cost-benefit ratio problematic.

FIG. 2 shows a schematic block diagram of an exemplary electrical supply system for a motor vehicle.

In the schematic block diagram, a 12 V load 240 of the motor vehicle represents one or more 12 V loads of the motor vehicle and is connected firstly to the ground of the motor vehicle and secondly to the on-board electrical system of the motor vehicle. A 12 V lead-acid battery 232 has a negative pole connected to the ground of the motor vehicle, and also is connected to the on-board electrical system of the motor vehicle. The on-board electrical system of the motor vehicle also has a DC/DC converter 230 with a low-voltage side connected to the on-board electrical system of the supply system 250. The DC/DC converter 230 also has a high-voltage side connected to a high-voltage energy storage means 220 and to a further high-voltage load 225. The high-voltage side of the on-board electrical system also is connected to the starter/generator system 210. This electrical supply system provides an increased voltage for starting the internal combustion engine.

Against this background, the object of the present invention is to provide an improved supply system that simplifies the construction and operation of an on-board electrical system with a motor/generator system.

SUMMARY OF THE INVENTION

The invention also provides an electrical supply and starting system for a motor vehicle. The electrical supply and starting system has a vehicle battery designed to supply a first DC voltage to an on-board electrical system of the motor vehicle. The system also has a motor/generator system connected to the on-board electrical system and designed to operate as a generator to deliver a second DC voltage to the on-board electrical system of the motor vehicle, and also to operate as a starter motor operated by the second DC voltage for starting an internal combustion engine of the motor vehicle. The second DC voltage is higher than the first DC voltage. The system also has an electrical energy storage arrangement connected to the on-board electrical system of the motor vehicle in parallel with the vehicle battery via a controllable DC/DC converter. The storage arrangement is designed to deliver the first and the second DC voltage to the on-board electrical system of the motor vehicle and to be charged with the second DC voltage, which can be delivered by the motor/generator system, and/or with the first DC voltage, which can be delivered by the vehicle battery.

The invention also provides a method for operating the electrical supply and starting system. The method comprising the steps of: supplying the on-board electrical system of a motor vehicle with a first DC voltage during a first operating state; and supplying the on-board electrical system of the motor vehicle with a second DC voltage during a second operating state.

The invention compensates for a dip in voltage in the on-board electrical system of the motor vehicle when starting an internal combustion engine of the motor vehicle. The advantages mainly achieved involve, in the first instance, being able to dispense with changeover switches for disconnecting the on-board system from the motor/generator system that is operated at a relatively high voltage. This permits cost-effective realization. Secondly, a direct connection is established between the on-board electrical system of the motor vehicle and the motor/generator system, without a DC/DC converter being connected therebetween. This minimizes the electrical losses.

The electrical energy storage arrangement preferably is designed so that electrical energy obtained recuperatively from the motor/generator system can be stored in the electrical energy storage arrangement.

The electrical energy storage arrangement preferably has at least one rechargeable battery.

The electrical energy storage arrangement preferably has at least one flywheel storage means.

The electrical energy storage arrangement preferably has at least one capacitor of the electrical supply and starting system.

The DC voltage of the electrical supply and starting system preferably is between 10 V and 15 V, with the rated voltage preferably being 12 V. Therefore, conventional electrical components can be used.

The second DC voltage of the electrical supply and starting system, is between 14 V and 18 V. This allows the system to remain in the region of the voltage of a customary 12 V on-board electrical system.

The controllable DC/DC converter preferably can be adjusted electronically adjusted between the first DC voltage and the second DC voltage by the DC/DC converter control apparatus to any desired value between the first and the second DC voltage.

The motor/generator system preferably is designed to start internal combustion engines with an engine capacity of more than 2 dm³.

The on-board electrical system can be supplied with electrical energy from the electrical energy storage arrangement when an internal combustion engine of the motor vehicle is stationary.

An operating state with a first DC voltage may comprise the internal combustion engine being stationary, with an electrical energy storage arrangement supplying the on-board system, and an operating state with a second DC voltage may comprise the internal combustion engine of the motor vehicle being started, with the electrical energy storage arrangement supplying the on-board system.

An operating state with a second DC voltage may comprise recuperative braking of the motor vehicle, with a motor/generator system, operating as a generator, supplying the on-board system by virtue of the recuperative braking.

The invention will be explained in greater detail below with reference to the exemplary embodiments illustrated in the schematic figures.

DETAILED DESCRIPTION OF THE PREFERRED EMBODIMENTS

Figure 1:
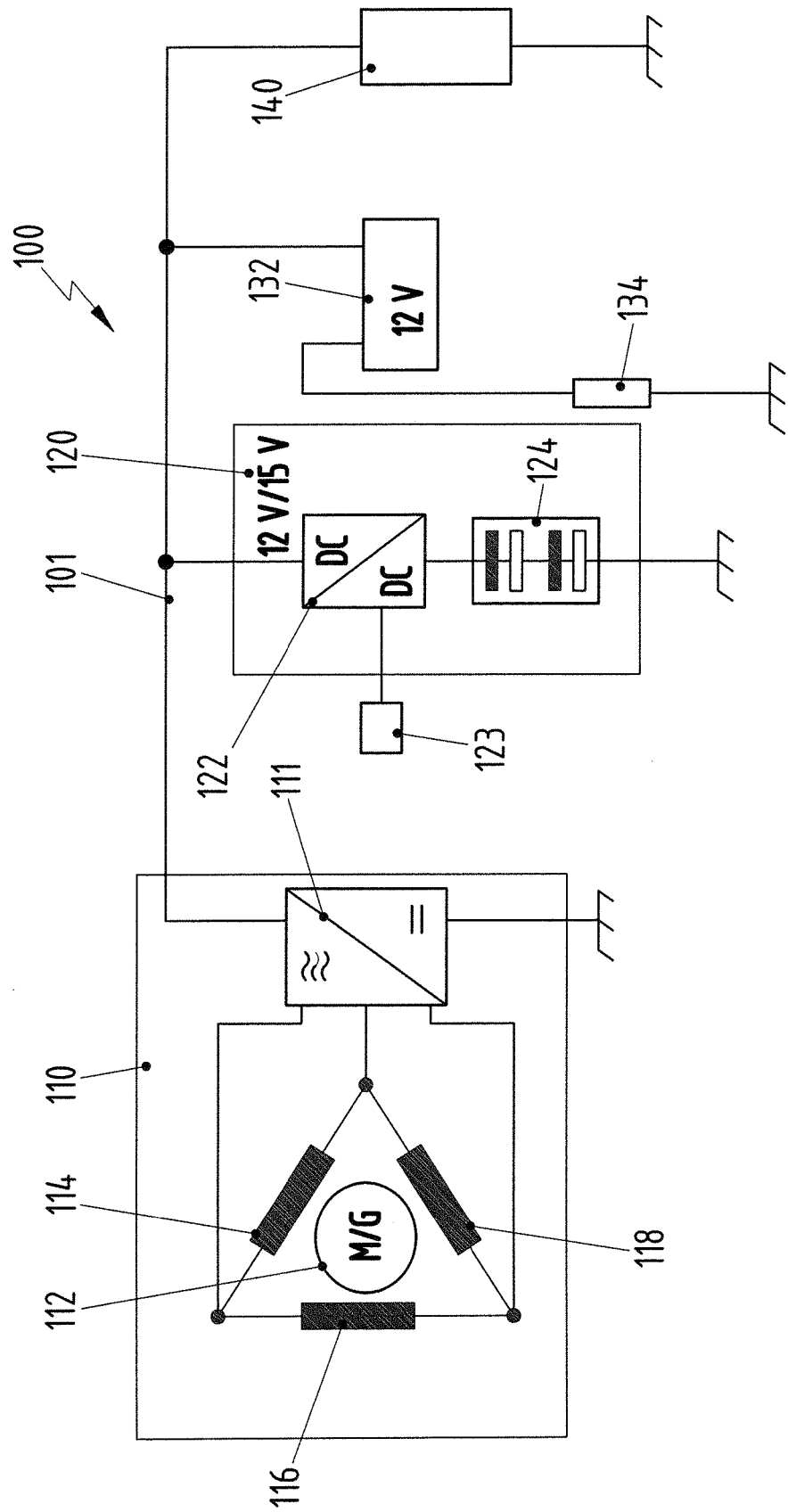
FIG. 1 is a schematic block diagram of an electrical supply and starting system for a motor vehicle according to one embodiment of the present invention.
Figure 2:
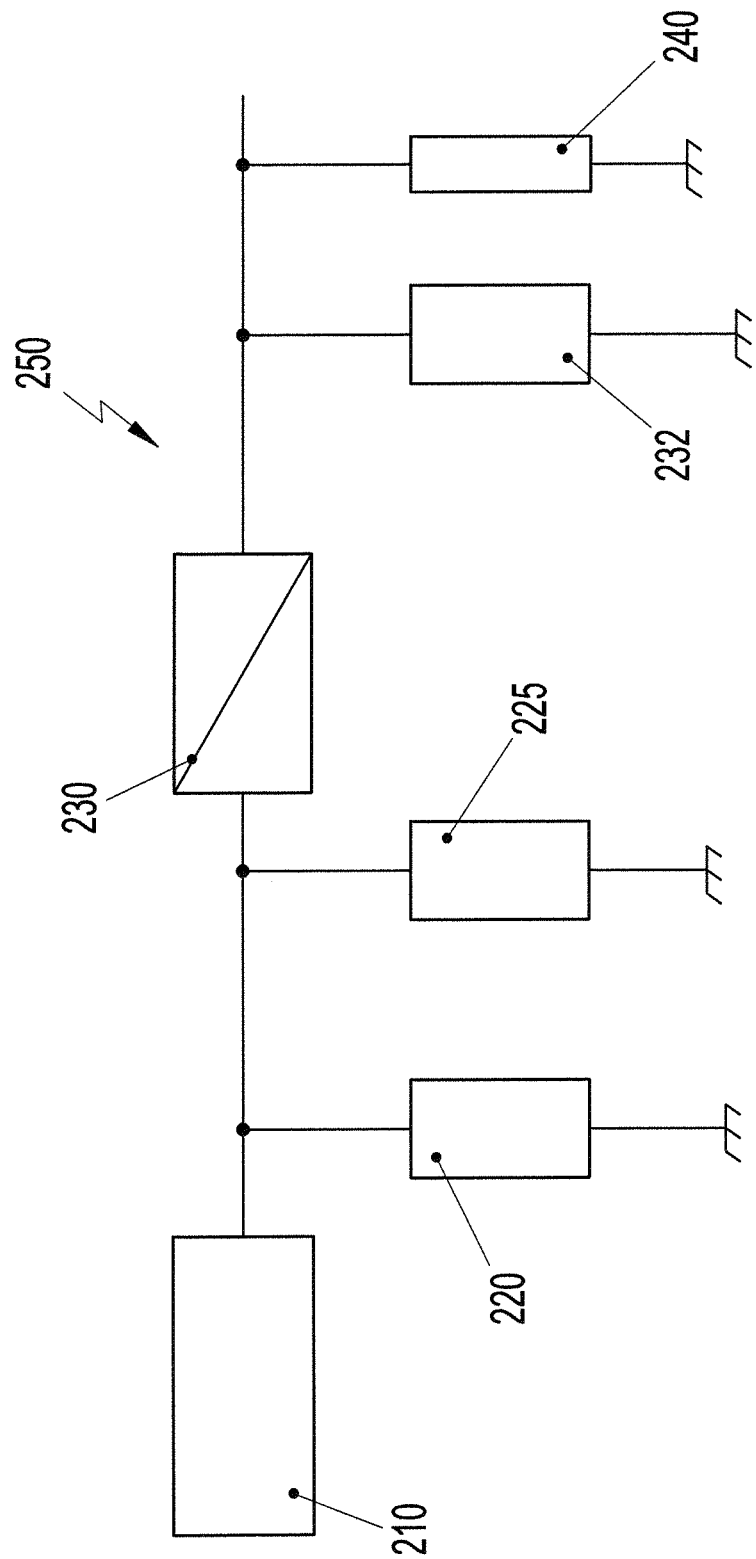
FIG. 2 is a schematic block diagram of an exemplary electrical supply system for a motor vehicle.

Identical or identically acting means, components and devices are provided with the same reference symbols in all the figures—unless stated otherwise.

The electrical supply and starting system 100 has an on-board electrical system 101, an electrical energy storage means in the form of a vehicle battery 132 that is coupled to the on-board electrical system 101, a motor/generator system 110, and an electrical energy storage arrangement 120. The electrical supply and starting system 100 also has at least one connectable load 140. The vehicle battery 132 has a fuse element 134. The motor/generator system 110 comprises an inverter device 111 that performs rectification when a motor/generator 112 is operated as a generator and allows the motor/generator 112 to operate as a motor (inverter). The motor/generator 112 comprises the motor windings 114, 116 and 118, with the motor/generator 112 being operated with the motor windings connected in delta.

The electrical energy storage arrangement 120 comprises a controllable DC/DC converter 122 and an electrical energy storage system 124. The electrical energy storage system 124 can be made up of a plurality of energy storage cells, with the electrical energy storage system 124 having, for example, a higher voltage than the on-board electrical system, this being advantageous for storing energy. The electrical energy storage arrangement 120 is connected in parallel with the vehicle battery 132. The controllable DC/DC converter 122 is controlled by a DC/DC converter control apparatus 123, in terms of the output voltage delivered by it to the on-board electrical system 101. Electrical loads 140 also are connected to the on-board electrical system 101.

During operation, the motor/generator system 110 can be operated either in a generator mode to supply power to the on-board electrical system 101, or in a motor mode to start the internal combustion engine of the motor vehicle. The on-board electrical system 101 can be supplied by the electrical energy storage arrangement 120 or the vehicle battery 132 when the internal combustion engine is stationary. The electrical energy storage arrangement 120 provides enough power to start the internal combustion engine. Thus, it is not necessary to change over electrical components to start the engine. Rather, it merely is necessary to use the DC/DC converter control apparatus 123 to increase the output voltage that the variable-voltage and controllable DC/DC converter 122 delivers to the motor/generator system 110. In addition, the electrical energy storage arrangement 120 with the controllable DC/DC converter 122 and the electrical energy storage system 124 can be used to store recuperation energy obtained with the aid of the motor/generator system 110 and use the recuperation energy when the engine is stationary by feeding the recuperation energy to the on-board electrical system 101.

The electrical energy storage system 124 may comprise a large number of energy storage cells with high-capacitance capacitors or double-layer capacitors, for example supercap, boostcap or ultracap modules.

The controllable DC/DC converter 122 converts, for example, the 12 volt on-board system voltage to a voltage in the voltage range of from approximately 15 V to 150 V on the side of the energy storage cells, with the controllable DC/DC converter 122 being of bidirectional design so that power can be transmitted in both directions. In this case, a higher voltage is advantageous since it allows cost-effective circuit breakers, for example transistors, to be used with the same power at lower current intensities.

What is claimed is:

1. An electrical supply and starting system for a motor vehicle, having:
   a vehicle battery connected to an on-board electrical system and designed to supply a first DC voltage to the on-board electrical system of the motor vehicle;
   a motor/generator system connected to the on-board electrical system and designed to operate as a generator for delivering a second DC voltage to the on-board electrical system of the motor vehicle, and to operate as a starter motor operated by the second DC voltage for starting an internal combustion engine of the motor vehicle, the second DC voltage being higher than the first DC voltage;
   an electrical energy storage arrangement including a controllable, bidirectional DC/DC converter connected to the on-board electrical system of the motor vehicle in parallel with the vehicle battery and an electrical energy storage system connected between the controllable, bidirectional DC/DC converter and a ground of the motor vehicle, the electrical energy storage arrangement being designed to deliver the first and the second DC voltage to the on-board electrical system of the motor vehicle and to charge the electrical energy storage system with the first DC voltage delivered by the vehicle battery or with the second DC voltage delivered by the motor/generator system.

2. The electrical supply and starting system of claim 1, wherein the electrical energy storage arrangement is designed so that electrical energy recuperatively obtained from the motor/generator system can be stored in the electrical energy storage arrangement.

3. The electrical supply and starting system of claim 1, wherein the electrical energy storage system has at least one rechargeable battery.

4. The electrical supply and starting system of claim 1, wherein the electrical energy storage system has at least one flywheel storage means.

5. The electrical supply and starting system of claim 1, wherein the electrical energy storage system has at least one capacitor.

6. The electrical supply and starting system of claim 1, wherein the first DC voltage is between 10 V and 15 V.

7. The electrical supply and starting system of claim 6, wherein the second DC voltage is between 14 V and 18 V.

8. The electrical supply and starting system of claim 1, wherein a DC/DC converter control apparatus is configured for electronically changing over the controllable, bidirectional DC/DC converter between the first voltage and the second voltage.

9. The electrical supply and starting system of claim 1, characterized in that the motor/generator system is designed to start internal combustion engines with an engine capacity of more than 2 $dm^3$.

10. The electrical supply and starting system of claim 1, wherein the electrical energy storage arrangement supplies the on-board electrical system with electrical energy when an internal combustion engine of the motor vehicle is stationary.

11. A method for operating an electrical supply and starting system, comprising:
    providing an on-board electrical system of a motor vehicle including:
    a vehicle battery connected to the on-board electrical system of the motor vehicle and designed to supply a first DC voltage;
    a motor/generator system connected to the on-board electrical system and designed to operate as a generator for delivering a second DC voltage to the on-board electrical system of the motor vehicle, and to operate as a starter motor operated by the second DC voltage for starting an internal combustion engine of the motor vehicle, the second DC voltage being higher than the first DC voltage; and
    an electrical energy storage arrangement including a controllable, bidirectional DC/DC converter connected to the on-board electrical system of the motor vehicle in parallel with the vehicle battery and an electrical energy storage system connected between the controllable, bidirectional DC/DC converter and a ground of the motor vehicle, the electrical energy storage arrangement being designed to deliver the first and the second DC voltage to the on-board electrical system of the motor;
    supplying the on-board electrical system of the motor vehicle with the first DC voltage during a first operating state; and
    supplying the on-board electrical system of the motor vehicle with the second DC voltage during a second operating state.

12. The method for operating an electrical supply and starting system of claim 11, wherein the first operating state comprises the internal combustion engine being stationary, with the electrical energy storage arrangement supplying the on-board electrical system, and the second operating state comprises the internal combustion engine of the motor vehicle being started, with the electrical energy storage arrangement supplying the on-board electrical system.

13. The method for operating an electrical supply and starting system of claim 12, wherein the second operating state comprises recuperative braking of the motor vehicle, with the motor/generator system operating as a generator supplying the on-board electrical system by virtue of the recuperative braking.

* * * * *